US012254805B1

(12) United States Patent
Zhu

(10) Patent No.: US 12,254,805 B1
(45) Date of Patent: Mar. 18, 2025

(54) PIXEL DRIVING CIRCUIT AND DISPLAY PANEL

(71) Applicant: GUANGZHOU CHINA STAR OPTOELECTRONICS SEMICONDUCTOR DISPLAY TECHNOLOGY CO., LTD., Guangdong (CN)

(72) Inventor: Maoxia Zhu, Guangdong (CN)

(73) Assignee: GUANGZHOU CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/523,423

(22) Filed: Nov. 29, 2023

(30) Foreign Application Priority Data

Oct. 17, 2023 (CN) ......................... 202311344424.5

(51) Int. Cl.
*G09G 3/3225* (2016.01)
*G09G 3/20* (2006.01)

(52) U.S. Cl.
CPC ....... *G09G 3/20* (2013.01); *G09G 2300/0819* (2013.01); *G09G 2300/0852* (2013.01); *G09G 2310/08* (2013.01); *G09G 2320/045* (2013.01)

(58) Field of Classification Search
CPC ....... G09G 2300/0819; G09G 2310/08; G09G 2320/045; G09G 3/3225; G09G 3/30; G09G 3/3233; G09G 3/3258; G09G 2300/043
See application file for complete search history.

(56) References Cited

U.S. PATENT DOCUMENTS

2023/0261010 A1* 8/2023 Miyake ............... H01L 29/7869
257/43

* cited by examiner

*Primary Examiner* — Dennis P Joseph
(74) *Attorney, Agent, or Firm* — HSML P. C.

(57) ABSTRACT

A pixel driving circuit and a display panel are provided. The pixel driving circuit includes a light-emitting module, an external detection module, and an internal compensation module. The light-emitting module is electrically connected to the external detection module and the internal compensation module. The external detection module is configured to acquire a threshold voltage of a second transistor when a display panel is turned on, and determine a shift direction of the threshold voltage. When the shift direction of the threshold voltage is a positive shift, the pixel driving circuit uses a first timing sequence to compensate the threshold voltage. When the shift direction of the threshold voltage is a negative shift, the pixel driving circuit uses a second timing sequence to compensate the threshold voltage.

18 Claims, 4 Drawing Sheets

PIXEL DRIVING CIRCUIT AND DISPLAY PANEL

CROSS REFERENCE TO RELATED APPLICATIONS

This application claims priority to Chinese Patent Application No. 202311344424.5, filed on Oct. 17, 2023, and entitled "PIXEL DRIVING CIRCUIT AND DISPLAY PANEL". The entire disclosures of the above application are incorporated herein by reference.

TECHNICAL FIELD

The present disclosure relates to the field of display technologies, and in particular to a pixel driving circuit and a display panel.

BACKGROUND

Existing external compensation of a shift of a threshold voltage requires a long time. Usually, a Vth shift detection is realized through an EE module during a startup stage. A signal is written into a data signal through an IC to realize the compensation. However, it is only compensated once after powering on, and real-time compensation cannot be achieved. In order to solve the above problems, an internal compensation circuit based on the threshold voltage shift is developed. The real-time compensation can be realized through a drive circuit design. However, a compensation range will be limited by a circuit architecture, and the compensation range will be smaller. Moreover, due to current batch-to-batch differences in the threshold voltage shift of the pixel driving circuit, it is difficult to fully compensate for the threshold voltage shift of all batches through a single timing internal compensation circuit.

Accordingly, the existing pixel driving circuit has a technical problem that cannot take into account real-time compensation and a large compensation range.

SUMMARY

Embodiments of the present disclosure provide a pixel driving circuit and a display panel, which can solve the technical problem that the existing pixel driving circuit cannot take into account real-time compensation and a large compensation range.

An embodiment of the present disclosure provides a pixel driving circuit, including a light-emitting module, an external detection module, and an internal compensation module. The light-emitting module is electrically connected to the external detection module and the internal compensation module;

- the light-emitting module includes a second transistor and a light-emitting unit, a first electrode of the second transistor is electrically connected to a high-electric potential power supply signal, and a second electrode of the second transistor is electrically connected to the light-emitting unit;
- the external detection module is configured to acquire a threshold voltage of the second transistor when a display panel is turned on, and determine a shift direction of the threshold voltage; and
- the internal compensation module is configured to use a first timing sequence to compensate the threshold voltage when the shift direction of the threshold voltage is a positive shift; the internal compensation module is configured to use a second timing sequence to compensate the threshold voltage when the shift direction of the threshold voltage is a negative shift; and the first timing sequence is different from the second timing sequence.

Alternatively, in some embodiments of the present disclosure, the positive shift of the shift direction of the threshold voltage means that the threshold voltage is greater than or equal to 0; and the negative shift of the shift direction of the threshold voltage means that the threshold voltage is less than 0.

Alternatively, in some embodiments of the present disclosure, when the threshold voltage is greater than or equal to 0, the internal compensation module is configured to use the first timing sequence to compensate the threshold voltage, and a compensation range of the threshold voltage is a first range; and when the threshold voltage is less than 0, the internal compensation module is configured to use the second timing sequence to compensate the threshold voltage, the compensation range of the threshold voltage is a second range, and the first range is different from the second range.

Alternatively, in some embodiments of the present disclosure, the first range ranges from 0 to 4V, and the second range ranges from −3V to 2V.

Alternatively, in some embodiments of the present disclosure, the pixel driving circuit is a 9T3C circuit, the light-emitting module further includes a first transistor, a third transistor, and a first capacitor, a gate of the first transistor is input with a first light-emitting signal, a first electrode of the first transistor is input with a high-electric potential power supply signal, a second electrode of the first transistor is connected to the first electrode of the second transistor, the second electrode of the second transistor is connected to a second electrode of the third transistor, a first electrode of the third transistor is connected to an anode of the light-emitting unit, a gate of the third transistor is input with a second light-emitting signal, a cathode of the light-emitting unit is input with a low-electric potential power supply signal, one terminal of the first capacitor is connected to the first electrode of the first transistor, and another terminal of the first capacitor is connected to the second electrode of the second transistor;

- the external detection module includes a first switch, a second switch, a chip, and a fourth transistor, a gate of the fourth transistor is input with a first scan signal, and a second electrode of the fourth transistor is electrically connected to the second electrode of the second transistor, a first electrode of the fourth transistor is connected to the chip through a first branch and a second branch arranged in parallel, the first branch includes the first switch, and the second branch includes the second switch;
- the internal compensation module includes a third capacitor, a fifth transistor, a seventh transistor, an eighth transistor, and a ninth transistor, one terminal of the third capacitor is connected to a gate of the second transistor, and another terminal of the third capacitor is connected to the second electrode of the second transistor, a gate of the fifth transistor is input with the first scan signal, a second electrode of the fifth transistor is electrically connected to a second electrode of the ninth transistor, a first electrode of the fifth transistor is connected to the second electrode of the first transistor, a first electrode of the ninth transistor is connected to the first electrode of the first transistor, and a gate of the ninth transistor is input with a third scan signal, a second electrode of the seventh transistor is connected to the second electrode of the ninth transistor, a first electrode of the seventh transistor is electrically connected to the gate of the second transistor, a gate of the seventh transistor is input with a fourth scan signal, a gate of the eighth transistor is input with a fifth scan signal, a first electrode of the eighth transistor is input with a second data signal, and a second electrode of the eighth transistor is connected to the gate of the second transistor.

Alternatively, in some embodiments of the present disclosure, the pixel driving circuit further includes a reset module, the reset module includes a sixth transistor and a second capacitor, a gate of the sixth transistor is input with a second scan signal, a second electrode of the sixth transistor is connected to the anode of the light-emitting unit and the second capacitor, and a first electrode of the sixth transistor is input with a reset signal.

Alternatively, in some embodiments of the present disclosure, working stages of the external detection module includes an initialization stage, a storage stage, and a detection stage; in the initialization stage, the external detection module resets a potential of a G-point at the gate and a potential of an S-point at the second electrode of the second transistor; in the storage stage, the external detection module charges the second electrode of the second transistor to turn off the second transistor; and in the detection stage, the external detection module reads the threshold voltage of the second transistor.

Alternatively, in some embodiments of the present disclosure, in the initialization stage, the first scan signal and the fifth scan signal are at a high potential, the fourth transistor is turned on, the eighth transistor is turned on, the second data signal is at a low potential, the low potential $V_{dataL}$ of the second data signal is written to the G-point at the gate of the second transistor, a constant reference voltage $V_{ref}$ is written to the S-point at the second electrode of the second transistor, and at this time, the potential $V_g$ of the G-point and the potential $V_s$ of the S-point are initialized, where $V_s=V_{ref}$ and $V_g=V_{dataL}$;

in the storage stage, the fifth scan signal is at the high potential, the eighth transistor is turned on, the second data signal is at the high potential, and at this time, the high potential $V_{dataH}$ of the second data signal is written to the G-point, the second transistor is turned on, and the S-point starts to be charged; when $V_s=V_{dataH}-V_{th}$, the second transistor is turned off, where the threshold voltage of the second transistor is $V_{th}$, and the potential of the S-point is charged to $V_s=V_{dataH}-V_{th}$; and in the detection stage, the first scan signal is at the high potential, the fourth transistor is turned on, the first switch is turned off, the first data signal is not input, and the second switch is turned on, so that the chip reads the potential of the S-point and acquires the threshold voltage $V_{th}$ of the second transistor.

Alternatively, in some embodiments of the present disclosure, when the $V_{th}>0$, the internal compensation module uses the first timing sequence to compensate the threshold voltage, and working stages of the first timing sequence includes a first reset stage, a writing and compensation stage, and a first light-emitting stage;

in the first reset stage, the third scan signal and the fourth scan signal are at the high potential, the seventh transistor and the ninth transistor are turned on, the high-electric potential power supply signal $V_{DD}$ is written to the G-point, the second scan signal is at the high potential, the sixth transistor is turned on, the reset signal $V_i$ is written to an A-point connecting the second capacitor and the first electrode of the sixth transistor, and at this time, the potential of the G-point is $V_g=V_{DD}$, and the potential $V_a$ of the A-point is equal to the $V_i$;

in the writing and compensation stage, the first light-emitting signal, the first scan signal, the second scan signal, the fourth scan signal, and the fifth scan signal are at the high potential, the first switch, the first transistor, the second transistor, the fourth transistor, the fifth transistor, the sixth transistor, and the seventh transistor are all turned on, the high potential $V_{DataH}'$ of the first data signal is written to the S-point, and at this time, the potential of the G-point is a sum of the potential of the S-point and the threshold voltage of the second transistor, and the potential of the A-point maintains at the $V_i$; and in the first light-emitting stage, the first light-emitting signal, the second light-emitting signal, the second data signal, and the fifth scan signal are at the high potential, the first transistor, the second transistor, and the third transistor are turned on, the potential $V_a$ of the A-point is equal to a sum of a voltage $V_{F,LED}$ of the light-emitting unit, the low-electric potential power supply signal $V_{SS}$, and a voltage $V_{IR(VSS)}$ of a wiring connecting the A-point and the light-emitting unit, the fourth scan signal is at the high potential, the seventh transistor is turned on, the potential of the G-point is increased by the potential of the A-point through the second capacitor, at this time, the potential of the G-point is $V_g=V_{DataH}'+V_{th}-V_{init}+V_{F,LED}+V_{SS}+V_{IR(VSS)}$, and the potential $V_s$ of the S-point is equal to a sum of the voltage $V_{F,LED}$ of the light-emitting unit, a divided voltage $V_{T3}$ of the third transistor, the voltage $V_{SS}$ of the low-electric potential power supply signal, and a voltage $V_{IR(VSS)}'$ of a wiring connecting the S-point and the light-emitting unit.

Alternatively, in some embodiments of the present disclosure, when $V_{th}<0$, the internal compensation module uses the second timing sequence to compensate the threshold voltage, working stages of the second timing sequence includes a second reset stage, an acquisition and storage stage, a data writing stage, and a second light-emitting stage;

in the second reset stage, the first scan signal and the fifth scan signal are at the high potential, the first switch is turned on, the fourth transistor is turned on, a $V_{neg}$ signal carried by the first data signal is written into the potential of the S-point, the eighth transistor is turned on, a $V_{pre}$ signal carried by the second data signal is written into the potential of the G-point to initialize the potentials of the G-point and the S-point, where $V_g=V_{pre}$ and $V_s=V_{neg}$;

in the acquisition and storage stage, the first scan signal, the fourth scan signal, the fifth scan signal, and the second data signal are at the high potential, the second transistor, the fifth transistor, and the seventh transistor are turned on; after the potential of the S-point is charged to $V_S=V_{pre}-V_{th}$, the second transistor is turned off, the S-point stops being charged, and the potential of the S-point maintains at $V_s=V_{pre}-V_{th}$;

in the data writing stage, the second data signal carries the high potential $V_{data2}$, the fifth scan signal is at the high potential, the eighth transistor is turned on, the potential of the G-point is $V_{data2}$, the second transistor is turned on, a coupling of the G-point through the third capacitor increases the potential of the S-point, at this time, the potential of the S-point is $V_s=(V_{pre}-V_{th})+(V_{data2}-V_{pre})*C_3/(C_1+C_3)$, a potential difference between the G-point and the S-point is $V_{gs}=(V_{data2}-V_{pre})*C_1/(C_1+C_3)+V_{th}$, where $C_1$ is a capacitance value of the first capacitor and $C_3$ is a capacitance value of the third capacitor; and in the second light-emitting stage, the potentials of the G-point and the S-point are maintained, the first light-emitting signal, the second light-emitting signal, the second data signal, and the fifth scan signal are at the high potential, and the first transistor, the second transistor, and the third transistor are turned on to cause the light-emitting unit to emit light.

An embodiment of the present disclosure provides a display panel including a pixel driving circuit. The pixel driving circuit includes a light-emitting module, an external detection module, and an internal compensation module, the light-emitting module is electrically connected to the external detection module and the internal compensation module;

the light-emitting module includes a second transistor and a light-emitting unit, a first electrode of the second transistor is electrically connected to a high-electric potential power supply signal, and a second electrode of the second transistor is electrically connected to the light-emitting unit;

the external detection module is configured to acquire a threshold voltage of the second transistor when a display panel is turned on, and determine a shift direction of the threshold voltage; and the internal compensation module is configured to use a first timing sequence to compensate the threshold voltage when the shift direction of the threshold voltage is a positive shift; the internal compensation module is configured to use a second timing sequence to compensate the threshold voltage when the shift direction of the threshold voltage is a negative shift; and the first timing sequence is different from the second timing sequence.

Alternatively, in some embodiments of the present disclosure, the positive shift of the shift direction of the threshold voltage means that the threshold voltage is greater than or equal to 0; and the negative shift of the shift direction of the threshold voltage means that the threshold voltage is less than 0.

Alternatively, in some embodiments of the present disclosure, when the threshold voltage is greater than or equal to 0, the internal compensation module is configured to use the first timing sequence to compensate the threshold voltage, and a compensation range of the threshold voltage is a first range; and when the threshold voltage is less than 0, the internal compensation module is configured to use the second timing sequence to compensate the threshold voltage, the compensation range of the threshold voltage is a second range, and the first range is different from the second range.

Alternatively, in some embodiments of the present disclosure, the first range ranges from 0 to 4V, and the second range ranges from −3V to 2V.

Alternatively, in some embodiments of the present disclosure, the pixel driving circuit is a 9T3C circuit, the light-emitting module further includes a first transistor, a third transistor, and a first capacitor, a gate of the first transistor is input with a first light-emitting signal, a first electrode of the first transistor is input with a high-electric potential power supply signal, a second electrode of the first transistor is connected to the first electrode of the second transistor, the second electrode of the second transistor is connected to a second electrode of the third transistor, a first electrode of the third transistor is connected to an anode of the light-emitting unit, a gate of the third transistor is input with a second light-emitting signal, a cathode of the light-emitting unit is input with a low-electric potential power supply signal, one terminal of the first capacitor is connected to the first electrode of the first transistor, and another terminal of the first capacitor is connected to the second electrode of the second transistor;

the external detection module includes a first switch, a second switch, a chip, and a fourth transistor, a gate of the fourth transistor is input with a first scan signal, and a second electrode of the fourth transistor is electrically connected to the second electrode of the second transistor, a first electrode of the fourth transistor is connected to the chip through a first branch and a second branch arranged in parallel, the first branch includes the first switch, and the second branch includes the second switch;

the internal compensation module includes a third capacitor, a fifth transistor, a seventh transistor, an eighth transistor, and a ninth transistor, one terminal of the third capacitor is connected to a gate of the second transistor, and another terminal of the third capacitor is connected to the second electrode of the second transistor, a gate of the fifth transistor is input with the first scan signal, a second electrode of the fifth transistor is electrically connected to a second electrode of the ninth transistor, a first electrode of the fifth transistor is connected to the second electrode of the first transistor, a first electrode of the ninth transistor is connected to the first electrode of the first transistor, and a gate of the ninth transistor is input with a third scan signal, a second electrode of the seventh transistor is connected to the second electrode of the ninth transistor, a first electrode of the seventh transistor is electrically connected to the gate of the second transistor, a gate of the seventh transistor is input with a fourth scan signal, a gate of the eighth transistor is input with a fifth scan signal, a first electrode of the eighth transistor is input with a second data signal, and a second electrode of the eighth transistor is connected to the gate of the second transistor.

Alternatively, in some embodiments of the present disclosure, the pixel driving circuit further includes a reset module, the reset module includes a sixth transistor and a second capacitor, a gate of the sixth transistor is input with a second scan signal, a second electrode of the sixth transistor is connected to the anode of the light-emitting unit and the second capacitor, and a first electrode of the sixth transistor is input with a reset signal.

Alternatively, in some embodiments of the present disclosure, working stages of the external detection module includes an initialization stage, a storage stage, and a detection stage; in the initialization stage, the external detection module resets a potential of a G-point at the gate and a potential of an S-point at the second electrode of the second transistor; in the storage stage, the external detection module charges the second electrode of the second transistor to turn off the second transistor; and in the detection stage, the external detection module reads the threshold voltage of the second transistor.

Alternatively, in some embodiments of the present disclosure, in the initialization stage, the first scan signal and the fifth scan signal are at a high potential, the fourth transistor is turned on, the eighth transistor is turned on, the second data signal is at a low potential, the low potential $V_{dataL}$ of the second data signal is written to the G-point at the gate of the second transistor, a constant reference voltage $V_{ref}$ is written to the S-point at the second electrode of the second transistor, and at this time, the potential $V_g$ of the G-point and the potential $V_s$ of the S-point are initialized, where $V_s=V_{ref}$ and $V_g=V_{dataL}$;

in the storage stage, the fifth scan signal is at the high potential, the eighth transistor is turned on, the second data signal is at the high potential, and at this time, the high potential $V_{dataH}$ of the second data signal is written to the G-point, the second transistor is turned on, and the S-point starts to be charged; when $V_s=V_{dataH}-V_{th}$, the second transistor is turned off, where the threshold voltage of the second transistor is $V_{th}$, and the potential of the S-point is charged to $V_s=V_{dataH}-V_{th}$, and in the detection stage, the first scan signal is at the high potential, the fourth transistor is turned on, the first switch is turned off, the first data signal is not input, and the second switch is turned on, so that the chip reads the potential of the S-point and acquires the threshold voltage $V_{th}$ of the second transistor.

Alternatively, in some embodiments of the present disclosure, when the $V_{th}>0$, the internal compensation module uses the first timing sequence to compensate the threshold voltage, and working stages of the first timing sequence includes a first reset stage, a writing and compensation stage, and a first light-emitting stage;

in the first reset stage, the third scan signal and the fourth scan signal are at the high potential, the seventh transistor and the ninth transistor are turned on, the high-electric potential power supply signal $V_{DD}$ is written to the G-point, the second scan signal is at the high potential, the sixth transistor is turned on, the reset signal $V_i$ is written to an A-point connecting the second capacitor and the first electrode of the sixth transistor, and at this time, the potential of the G-point is $V_g=V_{DD}$, and the potential $V_a$ of the A-point is equal to the $V_i$;

in the writing and compensation stage, the first light-emitting signal, the first scan signal, the second scan signal, the fourth scan signal, and the fifth scan signal are at the high potential, the first switch, the first transistor, the second transistor, the fourth transistor, the fifth transistor, the sixth transistor, and the seventh transistor are all turned on, the high potential $V_{DataH}'$ of the first data signal is written to the S-point, and at this time, the potential of the G-point is a sum of the potential of the S-point and the threshold voltage of the second transistor, and the potential of the A-point maintains at the $V_i$; and in the first light-emitting stage, the first light-emitting signal, the second light-emitting signal, the second data signal, and the fifth scan signal are at the high potential, the first transistor, the second transistor, and the third transistor are turned on, the potential $V_a$ of the A-point is equal to a sum of a voltage $V_{F,LED}$ of the light-emitting unit, the low-electric potential power supply signal $V_{SS}$, and a voltage $V_{IR(VSS)}$ of a wiring connecting the A-point and the light-emitting unit, the fourth scan signal is at the high potential, the seventh transistor is turned on, the potential of the G-point is increased by the potential of the A-point through the second capacitor, at this time, the potential of the G-point is $V_g=V_{DataH}'+V_{th}-V_{init}+V_{F,LED}+V_{SS}+V_{IR(VSS)}$, and the potential $V_s$ of the S-point is equal to a sum of the voltage $V_{F,LED}$ of the light-emitting unit, a divided voltage $V_{T3}$ of the third transistor, the voltage $V_{SS}$ of the low-electric potential power supply signal, and a voltage $V_{IR(VSS)}'$ of a wiring connecting the S-point and the light-emitting unit.

Alternatively, in some embodiments of the present disclosure, when $V_{th}<0$, the internal compensation module uses the second timing sequence to compensate the threshold voltage, working stages of the second timing sequence includes a second reset stage, an acquisition and storage stage, a data writing stage, and a second light-emitting stage;

in the second reset stage, the first scan signal and the fifth scan signal are at the high potential, the first switch is turned on, the fourth transistor is turned on, a $V_{neg}$ signal carried by the first data signal is written into the potential of the S-point, the eighth transistor is turned on, a $V_{pre}$ signal carried by the second data signal is written into the potential of the G-point to initialize the potentials of the G-point and the S-point, where $V_g=V_{pre}$ and $V_s=V_{neg}$;

in the acquisition and storage stage, the first scan signal, the fourth scan signal, the fifth scan signal, and the second data signal are at the high potential, the second transistor, the fifth transistor, and the seventh transistor are turned on; after the potential of the S-point is charged to $V_s=V_{pre}-V_{th}$, the second transistor is turned off, the S-point stops being charged, and the potential of the S-point maintains at $V_s=V_{pre}-V_{th}$;

in the data writing stage, the second data signal carries the high potential $V_{data2}$, the fifth scan signal is at the high potential, the eighth transistor is turned on, the potential of the G-point is $V_{data2}$, the second transistor is turned on, a coupling of the G-point through the third capacitor increases the potential of the S-point, at this time, the potential of the S-point is $V_s=(V_{pre}-V_{th})+(V_{data2}-V_{pre})*C_3/(C_1+C_3)$, a potential difference between the G-point and the S-point is $V_{gs}=(V_{data2}-V_{pre})*C_1/(C_1+C_3)+V_{th}$, where $C_1$ is a capacitance value of the first capacitor and $C_3$ is a capacitance value of the third capacitor; and in the second light-emitting stage, the potentials of the G-point and the S-point are maintained, the first light-emitting signal, the second light-emitting signal, the second data signal, and the fifth scan signal are at the high potential, and the first transistor, the second transistor, and the third transistor are turned on to cause the light-emitting unit to emit light.

Advantages are as follows. The pixel driving circuit including the external detection module and the internal compensation module is provided. The external detection module detects the shift direction of the threshold voltage at startup. When the shift direction of the threshold voltage is the positive shift, the internal compensation module is configured to use the first timing sequence to compensate the threshold voltage. When the shift direction of the threshold voltage is the negative shift, the internal compensation module is configured to use the second timing sequence to compensate the threshold voltage. Through internal compensation at different timings, internal real-time compensation that is more accurate and has a larger compensation range is achieved, which solves the technical problem of the existing pixel driving circuit being unable to take into account both real-time compensation and a larger compensation range.

BRIEF DESCRIPTION OF THE DRAWINGS

In order to more clearly illustrate technical solutions in the embodiments of the present disclosure, the drawings needed to be used in the specification of the embodiments will be briefly introduced below. Apparently, the drawings in the following description are only some examples of the present disclosure. For those skilled in the art, other drawings can also be obtained based on these drawings without exerting creative efforts.

DETAILED DESCRIPTION OF ILLUSTRATED EMBODIMENTS

Figure 1:
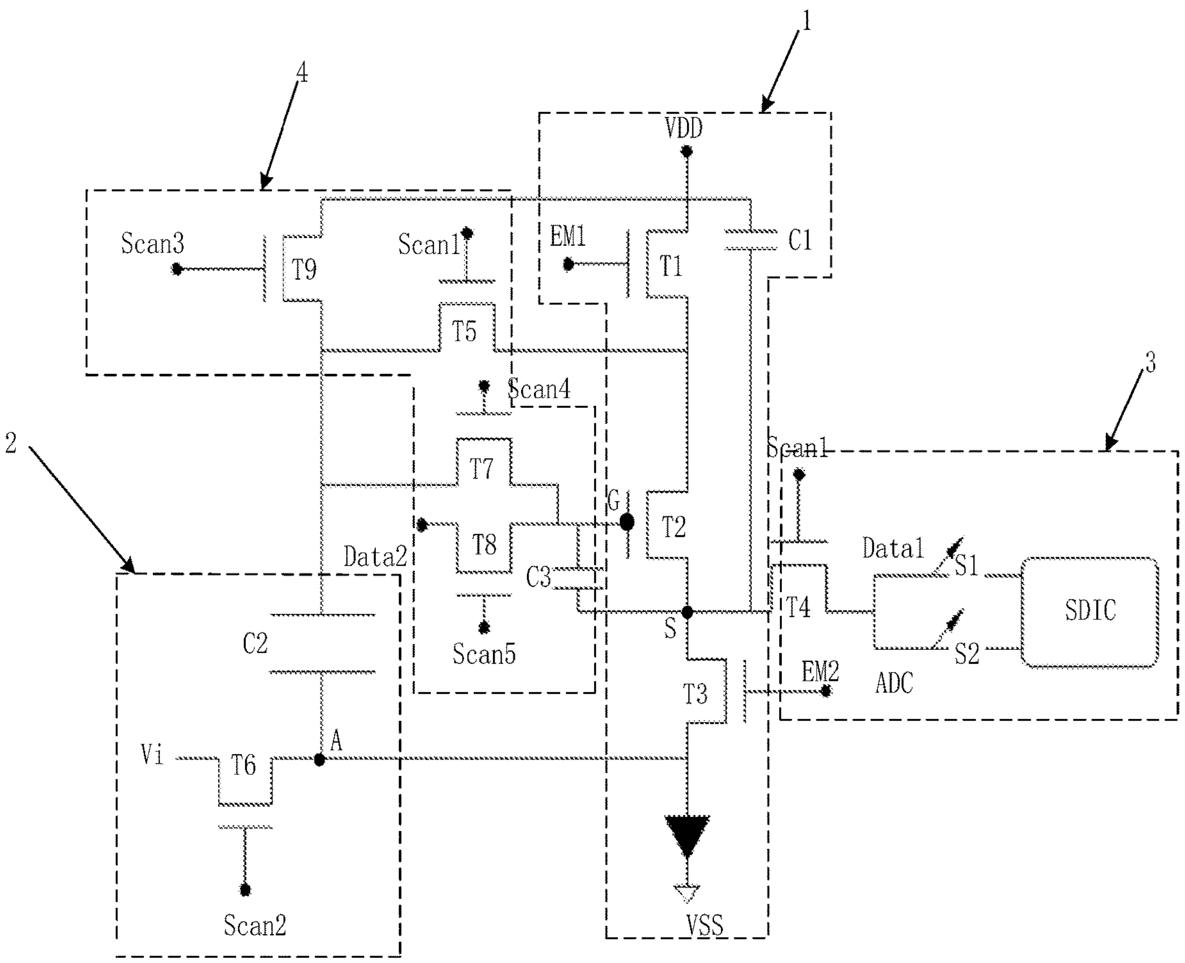
FIG. 1 is a schematic circuit structure diagram of a pixel driving circuit of the present disclosure.

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments in the present disclosure, all other embodiments obtained by those skilled in the art without making creative efforts shall fall within the scope of protection of the present disclosure. In addition, it should be understood that the specific embodiments described here are only used to illustrate and explain the present disclosure, and are not intended to limit the present disclosure. In the present disclosure, unless otherwise stated, directional terms, such as "upper" and "lower", usually refer to upper and lower positions of a device in actual use or working conditions, and specifically refer to drawing directions in the drawings, while "inner" and "outer" refer to the outline of the device.

Referring to FIG. 1, a pixel driving circuit of the present disclosure includes a light-emitting module 1, an external detection module 3, and an internal compensation module 4. The light-emitting module 1 is electrically connected to the external detection module 3 and the internal compensation module 4. The light-emitting module 1 includes a second transistor and a light-emitting unit. A first electrode of the second transistor is electrically connected to a high-electric potential power supply signal. A second electrode of the second transistor is electrically connected to the light-emitting unit. The external detection module is configured to acquire a threshold voltage of the second transistor when the display panel is turned on, and determine a shift direction of the threshold voltage. The internal compensation module is configured to use a first timing sequence to compensate the threshold voltage when the shift direction of the threshold voltage is a positive shift. The internal compensation module is configured to use a second timing sequence to compensate the threshold voltage when the shift direction of the threshold voltage is a negative shift.

It is understandable that by detecting the shift direction of the threshold voltage at startup through the external detection module 3, the shift direction of the threshold voltage during a period from startup to shutdown can be determined. That is, depending on whether the shift direction of the threshold voltage at startup is the positive shift or the negative shift, one of the first timing sequence and the second timing sequence is selected to compensate the threshold voltage, thereby achieving internal real-time compensation, which is more accurate and has a larger compensation range.

In this embodiment, the pixel driving circuit including the external detection module and the internal compensation module is provided. The external detection module detects the shift direction of the threshold voltage at startup. When the shift direction of the threshold voltage is the positive shift, the internal compensation module is configured to use the first timing sequence to compensate the threshold voltage. When the shift direction of the threshold voltage is the negative shift, the internal compensation module is configured to use the second timing sequence to compensate the threshold voltage. Through internal compensation at different timings, internal real-time compensation that is more accurate and has a larger compensation range is achieved, which solves the technical problem of the existing pixel driving circuit being unable to take into account both real-time compensation and a larger compensation range.

The technical solutions of the present disclosure will now be described with reference to specific embodiments.

It should be noted that first electrodes and second electrodes of a first transistor to a ninth transistor in the present disclosure are only for illustration. The present disclosure is explained by taking the following explanation as an example. A side of a certain transistor with a gate is a "downward direction", an electrode of the transistor located in a "left direction" of the gate is the first electrode, and an electrode of the transistor located in a "right direction" of the gate is the second electrode.

It should be noted that in FIG. 1 of the present disclosure, Scan1 is a first scan signal, Scan2 is a second scan signal, Scan3 is a third scan signal, Scan4 is a fourth scan signal, and Scan5 is a fifth scan signal, Data1 is a first data signal, Data2 is a second data signal, EM1 is a first light-emitting signal, EM2 is a second light-emitting signal, VSS is a low-electric potential power supply signal, VDD is a high-electric potential power supply signal, Vi is a reset signal, and ADC is a digital-to-analog conversion signal. Regarding connection relationships or positions of signal input terminals that are not described in the following content, a simple inference can be made with reference to FIG. 1.

Alternatively, in a specific embodiment, when the first electrode is a source, the second electrode is a drain. Alternatively, when the first electrode is a drain, the second electrode is a source.

In some embodiments, when the threshold voltage is greater than or equal to 0, the pixel driving circuit uses the first timing sequence to compensate the threshold voltage. A compensation range of the threshold voltage is a first range. When the threshold voltage is less than 0, the pixel driving circuit uses the second timing sequence to compensate the threshold voltage. A compensation range of the threshold voltage is a second range. The first range is different from the second range.

It can be understood that when the shift direction of the threshold voltage is the positive shift, it means that the threshold voltage is greater than or equal to 0. The shift direction of the threshold voltage is the negative shift, which means that the threshold voltage is less than 0.

In some embodiments, the first range ranges from 0 to 4V, and the second range ranges from −3V to 2V.

It can be understood that, refer to FIG. 1, an addition of the first range and the second range is the compensation range of the pixel driving circuit provided by the present disclosure. The compensation range of the pixel driving circuit to the shift of the threshold voltage ranges from −3V to 4V. Compared with a single internal compensation circuit in the prior art, the compensation range of the pixel driving circuit of the present disclosure is the addition of two timing compensation ranges. Therefore, a larger compensation range is achieved.

In some embodiments, refer to FIG. 1, the pixel driving circuit is a 9T3C circuit. The pixel driving circuit includes a first transistor, a second transistor, a third transistor, a fourth transistor, a fifth transistor, a sixth transistor, a seventh transistor, an eighth transistor, a ninth transistor, a first capacitor, a second capacitor, and a third capacitor.

In some embodiments, the light-emitting module 1 also includes the first transistor, the third transistor, and the first capacitor. A gate of the first transistor is input with a first light-emitting signal. A first electrode of the first transistor is input with a high-electric potential power supply signal. A second electrode of the first transistor is connected to the first electrode of the second transistor. The second electrode of the second transistor is connected to a second electrode of the third transistor. A first electrode of the third transistor is connected to an anode of the light-emitting unit. A gate of the third transistor is input with a second light-emitting signal. A cathode of the light-emitting unit is input with a low-electric potential power supply signal. One terminal of the first capacitor is connected to the first electrode of the first transistor, and another terminal of the first capacitor is connected to the second electrode of the second transistor.

The external detection module 3 includes a first switch, a second switch, a chip, and the fourth transistor. A gate of the fourth transistor is input with a first scan signal. A second electrode of the fourth transistor is electrically connected to the second electrode of the second transistor. A first electrode of the fourth transistor is connected to the chip through a first branch and a second branch arranged in parallel, the first branch includes the first switch, and the second branch includes the second switch.

The internal compensation module 4 includes the third capacitor, the fifth transistor, the seventh transistor, the eighth transistor, and the ninth transistor. One terminal of the third capacitor is connected to a gate of the second transistor, and another terminal of the third capacitor is connected to the second electrode of the second transistor. A gate of the fifth transistor is input with the first scan signal. A second electrode of the fifth transistor is electrically connected to a second electrode of the ninth transistor. A first electrode of the fifth transistor is connected to the second electrode of the first transistor. A first electrode of the ninth transistor is connected to the first electrode of the first transistor. A gate of the ninth transistor is input with a third scan signal. A second electrode of the seventh transistor is connected to the second electrode of the ninth transistor. A first electrode of the seventh transistor is electrically connected to the gate of the second transistor. A gate of the seventh transistor is input with a fourth scan signal. A gate of the eighth transistor is input with a fifth scan signal. A first electrode of the eighth transistor is input with a second data signal. A second electrode of the eighth transistor is connected to the gate of the second transistor.

In some embodiments, refer to FIG. 1, the pixel driving circuit further includes a reset module 2, the reset module 2 includes the sixth transistor and the second capacitor. A gate of the sixth transistor is input with a second scan signal. A second electrode of the sixth transistor is connected to the anode of the light-emitting unit and the second capacitor. A first electrode of the sixth transistor is input with a reset signal.

Figure 2:
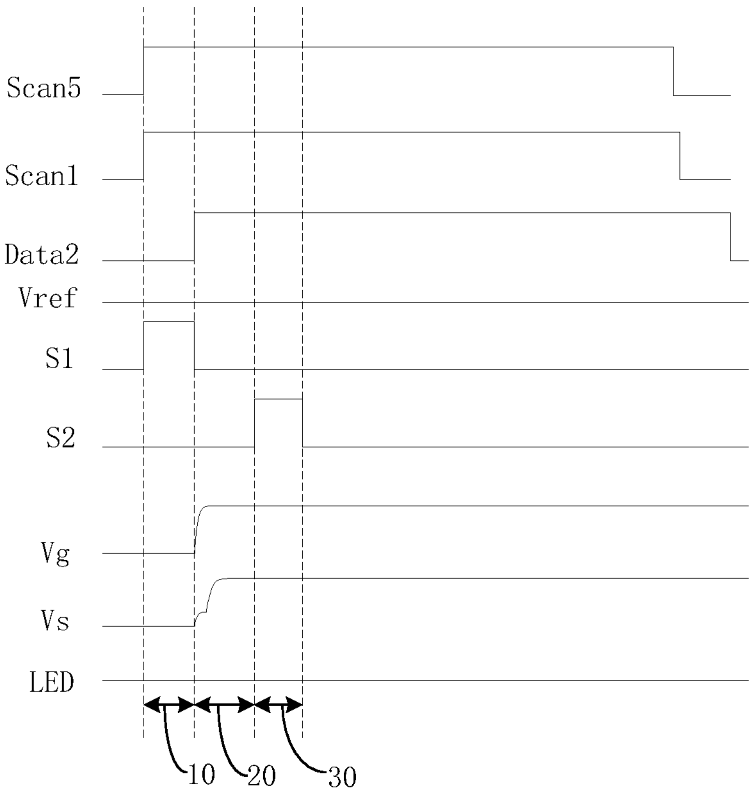
FIG. 2 is a timing diagram of an external detection module of the pixel driving circuit of the present disclosure.

In some embodiments, refer to FIG. 2, working stages of the external detection module 3 includes an initialization stage 10, a storage stage 20, and a detection stage 30. In the initialization stage 10, the external detection module 3 resets a potential of a G-point at the gate and a potential of an S-point at the second electrode of the second transistor. In the storage stage 20, the external detection module charges the second electrode of the second transistor to turn off the second transistor. In the detection stage 30, the external detection module reads the threshold voltage of the second transistor.

In the initialization stage 10, the first scan signal and the fifth scan signal are at a high potential, the fourth transistor is turned on, the eighth transistor is turned on, the second data signal is at a low potential, the low potential $V_{dataL}$ of the second data signal is written to the G-point at the gate of the second transistor, a constant reference voltage $V_{ref}$ is written to the S-point at the second electrode of the second transistor. At this time, the potential $V_g$ of the G-point and the potential $V_s$ of the S-point are initialized, where $V_s=V_{ref}$ and $V_g=V_{dataL}$.

In the storage stage 20, the fifth scan signal is at the high potential, the eighth transistor is turned on, the second data signal is at the high potential. At this time, the high potential $V_{dataH}$ of the second data signal is written to the G-point, the second transistor is turned on, and the S-point starts to be charged. When $V_s=V_{dataH}-V_{th}$, the second transistor is turned off, where the threshold voltage of the second transistor is $V_{th}$, and the potential of the S-point is charged to $V_s=V_{dataH}-V_{th}$.

In the detection stage 30, the first scan signal is at the high potential, the fourth transistor is turned on, the first switch is turned off, the first data signal is not input, and the second switch is turned on, so that the chip reads the potential of the S-point and acquires the threshold voltage $V_{th}$ of the second transistor.

Figure 3:
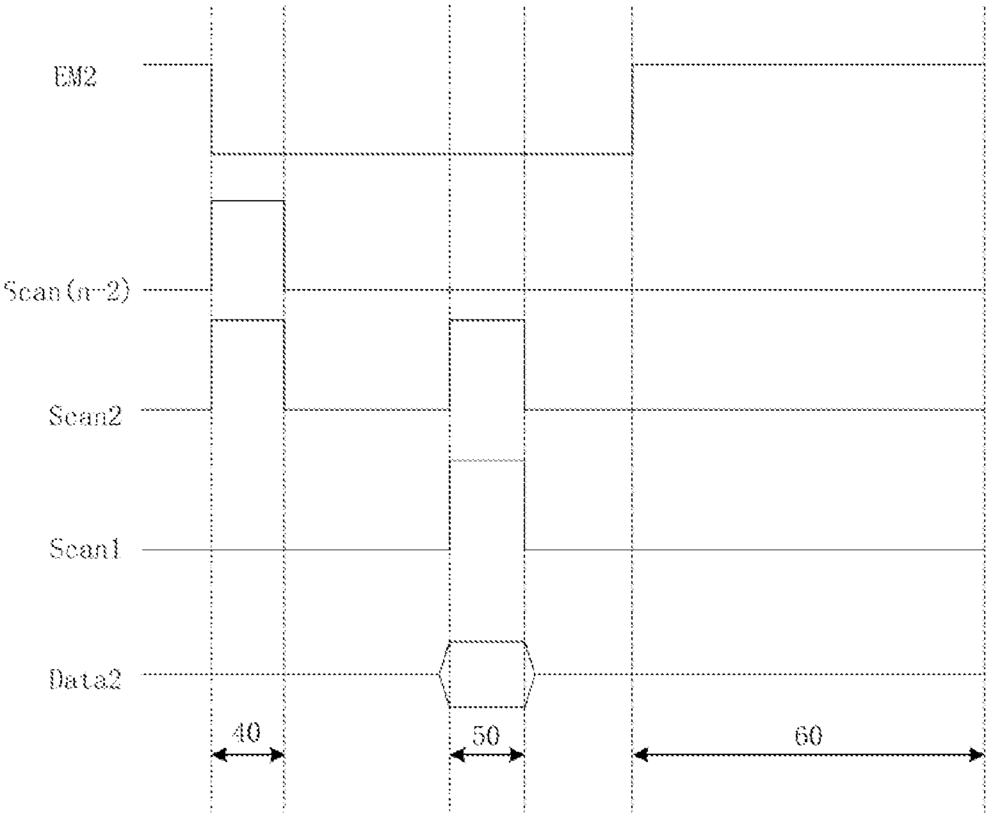
FIG. 3 is a first timing diagram of an internal compensation module of the pixel driving circuit of the present disclosure.

In some embodiments, refer to FIG. 3, when the $V_{th}>0$, the internal compensation module 4 uses the first timing sequence to compensate the threshold voltage, and working stages of the first timing sequence includes a first reset stage 40, a writing and compensation stage 50, and a first light-emitting stage 60.

In the first reset stage 40, the third scan signal and the fourth scan signal are at the high potential, the seventh transistor and the ninth transistor are turned on, the high-electric potential power supply signal $V_{DD}$ is written to the G-point, the second scan signal is at the high potential, the sixth transistor is turned on, the reset signal $V_i$ is written to an A-point connecting the second capacitor and the first electrode of the sixth transistor. At this time, the potential of the G-point is $V_g=V_{DD}$, and the potential $V_a$ of the A-point is equal to the $V_i$.

In the writing and compensation stage 50, the first light-emitting signal, the first scan signal, the second scan signal, the fourth scan signal, and the fifth scan signal are at the high potential, the first switch, the first transistor, the second transistor, the fourth transistor, the fifth transistor, the sixth transistor, and the seventh transistor are all turned on, the high potential $V_{DataH}'$ of the first data signal is written to the S-point. At this time, the potential of the G-point is a sum of the potential of the S-point and the threshold voltage of the second transistor, i.e., $V_g=V_{DataH}'+V_{th}$, and the potential of the A-point maintains at the $V_i$.

In the first light-emitting stage 60, the first light-emitting signal, the second light-emitting signal, the second data signal, and the fifth scan signal are at the high potential, the first transistor, the second transistor, and the third transistor are turned on, the potential $V_a$ of the A-point is equal to a sum of a voltage $V_{F,LED}$ of the light-emitting unit, the low-electric potential power supply signal $V_{SS}$, and a voltage $V_{IR(VSS)}$ of a wiring connecting the A-point and the light-emitting unit, that is, $V_a=V_{F,LED}+V_{SS}+V_{IR(VSS)}$. The fourth scan signal is at the high potential, the seventh transistor is turned on, the potential of the G-point is increased by the potential of the A-point through the second capacitor. At this time, the potential of the G-point is $V_g=V_{DataH}'+V_{th}-V_{init}+V_{F,LED}+V_{SS}+V_{IR(VSS)}$, and the potential $V_s$ of the S-Point is equal to a sum of the voltage $V_{F,LED}$ of the light-emitting unit, a divided voltage $V_{T3}$ of the third transistor, the voltage $V_{SS}$ of the low-electric potential power supply signal, and a voltage $V_{IR(VSS)}'$ of a wiring connecting the S-point and the light-emitting unit, that is $V_s=V_{F,LED}+V_{T3}+V_{SS}+V_{IR(VSS)}'$.

It can be understood that in the first reset stage 40, $V_{DD}$ is written to the gate of the second transistor. In writing and compensation stage 50, after $V_{dataH}$ is written to the A-point, $V_{th}$ is detected. Therefore, a maximum value of $V_{th}$ that can be detected before and after drift is $V_{DD}-V_{dataH}$. $V_{th}$ needs to be ensured to be greater than 0 so that $V_{th}$ can be correctly stored into the gate. That is, the compensation range of the threshold voltage of the first timing sequence is: $0<V_{th}<V_{DD}-V_{dataH}-V_{th}$.

Figure 4:
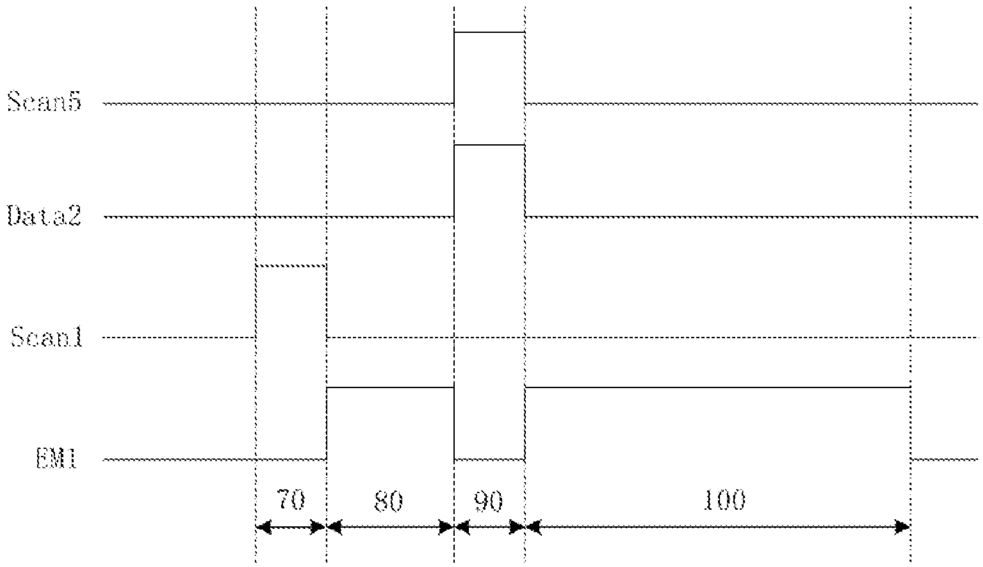
FIG. 4 is a second timing diagram of an internal compensation module of the pixel driving circuit of the present disclosure.

In some embodiments, refer to FIG. 4, when $V_{th}<0$, the internal compensation module 4 uses the second timing sequence to compensate the threshold voltage, working stages of the second timing sequence includes a second reset stage 70, an acquisition and storage stage 80, a data writing stage 90, and a second light-emitting stage 100.

In the second reset stage 70, the first scan signal and the fifth scan signal are at the high potential, the first switch is turned on, the fourth transistor is turned on, a $V_{neg}$ signal carried by the first data signal is written into the potential of the S-point, the eighth transistor is turned on, a $V_{pre}$ signal carried by the second data signal is written into the potential of the G-point to initialize the potentials of the G-point and the S-point, where $V_g=V_{pre}$ and $V_s-V_{neg}$.

In the acquisition and storage stage 80, the first scan signal, the fourth scan signal, the fifth scan signal, and the second data signal are at the high potential, the second transistor, the fifth transistor, and the seventh transistor are turned on. After the potential of the S-point is charged to $V_s=V_{pre}-V_{th}$, the second transistor is turned off, the S-point stops being charged, and the potential of the S-point maintains at $V_s=V_{pre}-V_{th}$.

In the data writing stage 90, the second data signal carries the high potential $V_{data2}$, the fifth scan signal is at the high potential, the eighth transistor is turned on, the potential of the G-point is $V_{data2}$, the second transistor is turned on, a coupling of the G-point through the third capacitor increases the potential of the S-point. At this time, the potential of the S-point is $V_s=(V_{pre}-V_{th})+(V_{data2}-V_{pre})*C_3/(C_1+C_3)$, a potential difference between the G-point and the S-point is $V_{gs}=(V_{data2}-V_{pre})*C_1/(C_1+C_3)+V_{th}$, where $C_1$ is a capacitance value of the first capacitor and $C_3$ is a capacitance value of the third capacitor.

In the second light-emitting stage 100, the potentials of the G-point and the S-point are maintained, the first light-emitting signal, the second light-emitting signal, the second data signal, and the fifth scan signal are at the high potential, and the first transistor, the second transistor, and the third transistor are turned on to cause the light-emitting unit to emit light.

In some embodiments, a purpose of the second light-emitting stage 100 is to maintain the voltage difference between G and S-points so that the light-emitting unit emits light.

$$V_s=V_{LED}+V_{SS},\ V_g=V_{data2}+V_{LED}+V_{SS}-(V_{pre}-V_{th})-(V_{data2}-V_{pre})*C_2/(C_1+C_2),\ V_{gs}-V_{th}=V_{data2}-V_{pre}-(V_{data2}-V_{pre})*C_2/(C_1+C_2).$$

It can be understood that the second timing sequence is used to compensate the threshold voltage. When the second transistor is turned on, at this time, $V_{pre}-V_{ref}>V_{th}$. When the second transistor works in a saturation zone, $V_{ds}>V_{gs}-V_{th}$. When the light-emitting unit is turned off, $V_{pre}-V_{th}-V_{SS}<V_{LED}$. The compensation range of the threshold voltage is: $V_{pre}-V_{SS}-V_{LED}<V_{th}<V_{DataL}-V_{ref}$.

The present disclosure also proposes a display panel, a display module, and a display device. The display panel, the display module, and the display device all include the above-mentioned pixel driving circuit, which will not be described again here.

The pixel driving circuit provided by the embodiments of the present disclosure includes the light-emitting module, the external detection module, and the internal compensation module. The light-emitting module is electrically connected to the reset module, the external detection module, and the internal compensation module. The external detection module is configured to acquire the threshold voltage of the second transistor when the display panel is started, and determine the shift direction of the threshold voltage. The internal compensation module is configured to use the first timing sequence to compensate the threshold voltage when the shift direction of the threshold voltage is the positive shift. The internal compensation module is configured to use the second timing sequence to compensate the threshold voltage when the shift direction of the threshold voltage is the negative shift. Through internal compensation in different timing sequences, internal real-time compensation with more accuracy and larger compensation range is achieved.

In the foregoing embodiments, the description of each embodiment has its own emphasis. For the parts not described in detail in one embodiment, reference may be made to related descriptions in other embodiments.

The pixel driving circuit of the embodiments of the present disclosure have been described in detail above. Specific examples have been used in the specification to explain the principles and implementation manners of the present disclosure. The descriptions of the above embodiments are only used to facilitate understanding of the methods and core ideas of the present disclosure. Persons of ordinary skill in the art may change the implementation and application scope according to the ideas of the present application. In summary, the content of this specification should not be construed as a limitation on the present disclosure.

What is claimed is:

1. A pixel driving circuit, comprising: a light-emitting module, an external detection module, and an internal compensation module, wherein the light-emitting module is electrically connected to the external detection module and the internal compensation module;

wherein the light-emitting module comprises a second transistor and a light-emitting unit, a first electrode of the second transistor is electrically connected to a high-electric potential power supply signal, and a second electrode of the second transistor is electrically connected to the light-emitting unit;

the external detection module is configured to acquire a threshold voltage of the second transistor when a display panel is turned on, and determine a shift direction of the threshold voltage; and the internal compensation module is configured to use a first timing sequence to compensate the threshold voltage when the shift direction of the threshold voltage is a positive shift; the internal compensation module is configured to use a second timing sequence to compensate the threshold voltage when the shift direction of the threshold voltage is a negative shift; and the first timing sequence is different from the second timing sequence;

wherein the pixel driving circuit is a 9T3C circuit, the light-emitting module further comprises a first transistor, a third transistor, and a first capacitor, a gate of the first transistor is input with a first light-emitting signal, a first electrode of the first transistor is input with a high-electric potential power supply signal, a second electrode of the first transistor is connected to the first electrode of the second transistor, the second electrode of the second transistor is connected to a second electrode of the third transistor, a first electrode of the third transistor is connected to an anode of the light-emitting unit, a gate of the third transistor is input with a second light-emitting signal, a cathode of the light-emitting unit is input with a low-electric potential power supply signal, one terminal of the first capacitor is connected to the first electrode of the first transistor, and another terminal of the first capacitor is connected to the second electrode of the second transistor;

the external detection module comprises a first switch, a second switch, a chip, and a fourth transistor, a gate of the fourth transistor is input with a first scan signal, and a second electrode of the fourth transistor is electrically connected to the second electrode of the second transistor, a first electrode of the fourth transistor is connected to the chip through a first branch and a second branch arranged in parallel, the first branch comprises the first switch, and the second branch comprises the second switch;

the internal compensation module comprises a third capacitor, a fifth transistor, a seventh transistor, an eighth transistor, and a ninth transistor, one terminal of the third capacitor is connected to a gate of the second transistor, and another terminal of the third capacitor is connected to the second electrode of the second transistor, a gate of the fifth transistor is input with the first scan signal, a second electrode of the fifth transistor is electrically connected to a second electrode of the ninth transistor, a first electrode of the fifth transistor is connected to the second electrode of the first transistor, a first electrode of the ninth transistor is connected to the first electrode of the first transistor, and a gate of the ninth transistor is input with a third scan signal, a second electrode of the seventh transistor is connected to the second electrode of the ninth transistor, a first electrode of the seventh transistor is electrically connected to the gate of the second transistor, a gate of the seventh transistor is input with a fourth scan signal, a gate of the eighth transistor is input with a fifth scan signal, a first electrode of the eighth transistor is input with a second data signal, and a second electrode of the eighth transistor is connected to the gate of the second transistor.

2. The pixel driving circuit of claim 1, wherein the positive shift of the shift direction of the threshold voltage means that the threshold voltage is greater than or equal to 0; and the negative shift of the shift direction of the threshold voltage means that the threshold voltage is less than 0.

3. The pixel driving circuit of claim 1, wherein when the threshold voltage is greater than or equal to 0, the internal compensation module is configured to use the first timing sequence to compensate the threshold voltage, and a compensation range of the threshold voltage is a first range; and when the threshold voltage is less than 0, the internal compensation module is configured to use the second timing sequence to compensate the threshold voltage, the compensation range of the threshold voltage is a second range, and the first range is different from the second range.

4. The pixel driving circuit of claim 3, wherein the first range ranges from 0 to 4V, and the second range ranges from −3V to 2V.

5. The pixel driving circuit of claim 1, further comprising a reset module, wherein the reset module comprises a sixth transistor and a second capacitor, a gate of the sixth transistor is input with a second scan signal, a second electrode of the sixth transistor is connected to the anode of the light-emitting unit and the second capacitor, and a first electrode of the sixth transistor is input with a reset signal.

6. The pixel driving circuit of claim 5, wherein working stages of the external detection module comprises an initialization stage, a storage stage, and a detection stage; in the initialization stage, the external detection module resets a potential of a G-point at the gate and a potential of an S-point at the second electrode of the second transistor; in the storage stage, the external detection module charges the second electrode of the second transistor to turn off the second transistor; and in the detection stage, the external detection module reads the threshold voltage of the second transistor.

7. The pixel driving circuit of claim 6, wherein in the initialization stage, the first scan signal and the fifth scan signal are at a high potential, the fourth transistor is turned on, the eighth transistor is turned on, the second data signal is at a low potential, the low potential $V_{dataL}$ of the second data signal is written to the G-point at the gate of the second transistor, a constant reference voltage $V_{ref}$ is written to the S-point at the second electrode of the second transistor, and at this time, the potential $V_g$ of the G-point and the potential $V_s$ of the S-point are initialized, where $V_s=V_{ref}$ and $V_g=V_{dataL}$;

in the storage stage, the fifth scan signal is at the high potential, the eighth transistor is turned on, the second data signal is at the high potential, and at this time, the high potential $V_{dataH}$ of the second data signal is written to the G-point, the second transistor is turned on, and the S-point starts to be charged; when $V_s=V_{dataH}-V_{th}$, the second transistor is turned off, wherein the threshold voltage of the second transistor is $V_{th}$, and the potential of the S-point is charged to $V_s=V_{dataH}-V_{th}$; and in the detection stage, the first scan signal is at the high potential, the fourth transistor is turned on, the first switch is turned off, the first data signal is not input, and the second switch is turned on, so that the chip reads the potential of the S-point and acquires the threshold voltage $V_{th}$ of the second transistor.

8. The pixel driving circuit of claim 7, wherein when the $V_{th}>0$, the internal compensation module uses the first timing sequence to compensate the threshold voltage, and working stages of the first timing sequence comprises a first reset stage, a writing and compensation stage, and a first light-emitting stage;

in the first reset stage, the third scan signal and the fourth scan signal are at the high potential, the seventh transistor and the ninth transistor are turned on, the high-electric potential power supply signal $V_{DD}$ is written to the G-point, the second scan signal is at the high potential, the sixth transistor is turned on, the reset signal $V_i$ is written to an A-point connecting the second capacitor and the first electrode of the sixth transistor, and at this time, the potential of the G-point is $V_g=V_{DD}$, and the potential $V_a$ of the A-point is equal to the $V_i$;

in the writing and compensation stage, the first light-emitting signal, the first scan signal, the second scan signal, the fourth scan signal, and the fifth scan signal are at the high potential, the first switch, the first transistor, the second transistor, the fourth transistor, the fifth transistor, the sixth transistor, and the seventh transistor are all turned on, the high potential $V_{DataH}'$ of the first data signal is written to the S-point, and at this time, the potential of the G-point is a sum of the potential of the S-point and the threshold voltage of the second transistor, and the potential of the A-point maintains at the $V_i$; and in the first light-emitting stage, the first light-emitting signal, the second light-emitting signal, the second data signal, and the fifth scan signal are at the high potential, the first transistor, the second transistor, and the third transistor are turned on, the potential $V_a$ of the A-point is equal to a sum of a voltage $V_{F,LED}$ of the light-emitting unit, the low-electric potential power supply signal $V_{SS}$, and a voltage $V_{IR(VSS)}$ of a wiring connecting the A-point and the light-emitting unit, the fourth scan signal is at the high potential, the seventh transistor is turned on, the potential of the G-point is increased by the potential of the A-point through the second capacitor, at this time, the potential of the G-point is $V_g=V_{DataH}'+V_{th}-V_{init}+V_{F,LED}+V_{SS}+V_{IR(VSS)}$, and the potential $V_s$ of the S-point is equal to a sum of the voltage $V_{F,LED}$ of the light-emitting unit, a divided voltage $V_{T3}$ of the third transistor, the voltage $V_{SS}$ of the low-electric potential power supply signal, and a voltage $V_{IR(VSS)}'$ of a wiring connecting the S-point and the light-emitting unit.

9. The pixel driving circuit of claim 7, wherein when $V_{th}<0$, the internal compensation module uses the second timing sequence to compensate the threshold voltage, working stages of the second timing sequence comprises a second reset stage, an acquisition and storage stage, a data writing stage, and a second light-emitting stage;

in the second reset stage, the first scan signal and the fifth scan signal are at the high potential, the first switch is turned on, the fourth transistor is turned on, a $V_{neg}$ signal carried by the first data signal is written into the potential of the S-point, the eighth transistor is turned on, a $V_{pre}$ signal carried by the second data signal is written into the potential of the G-point to initialize the potentials of the G-point and the S-point, wherein $V_g=V_{pre}$ and $V_s=V_{neg}$;

in the acquisition and storage stage, the first scan signal, the fourth scan signal, the fifth scan signal, and the second data signal are at the high potential, the second transistor, the fifth transistor, and the seventh transistor are turned on; after the potential of the S-point is charged to $V_S=V_{pre}-V_{th}$, the second transistor is turned off, the S-point stops being charged, and the potential of the S-point maintains at $V_s=V_{pre}-V_{th}$;

in the data writing stage, the second data signal carries the high potential $V_{data2}$, the fifth scan signal is at the high potential, the eighth transistor is turned on, the potential of the G-point is $V_{data2}$, the second transistor is turned on, a coupling of the G-point through the third capacitor increases the potential of the S-point, at this time, the potential of the S-point is $V_s=(V_{pre}-V_{th})+(V_{data2}-V_{pre})*C_3/(C_1+C_3)$, a potential difference between the G-point and the S-point is $V_{gs}=(V_{data2}-V_{pre})*C_1/(C_1+C_3)+V_{th}$, wherein $C_1$ is a capacitance value of the first capacitor and $C_3$ is a capacitance value of the third capacitor; and in the second light-emitting stage, the potentials of the G-point and the S-point are maintained, the first light-emitting signal, the second light-emitting signal, the second data signal, and the fifth scan signal are at the high potential, and the first transistor, the second transistor, and the third transistor are turned on to cause the light-emitting unit to emit light.

10. A display panel, comprising a pixel driving circuit, wherein the pixel driving circuit comprises a light-emitting module, an external detection module, and an internal compensation module, the light-emitting module is electrically connected to the external detection module and the internal compensation module;

wherein the light-emitting module comprises a second transistor and a light-emitting unit, a first electrode of the second transistor is electrically connected to a high-electric potential power supply signal, and a second electrode of the second transistor is electrically connected to the light-emitting unit;

the external detection module is configured to acquire a threshold voltage of the second transistor when a display panel is turned on, and determine a shift direction of the threshold voltage; and the internal compensation module is configured to use a first timing sequence to compensate the threshold voltage when the shift direction of the threshold voltage is a positive shift; the internal compensation module is configured to use a second timing sequence to compensate the threshold voltage when the shift direction of the threshold voltage is a negative shift; and the first timing sequence is different from the second timing sequence;

wherein the pixel driving circuit is a 9T3C circuit, the light-emitting module further comprises a first transistor, a third transistor, and a first capacitor, a gate of the first transistor is input with a first light-emitting signal, a first electrode of the first transistor is input with a high-electric potential power supply signal, a second electrode of the first transistor is connected to the first electrode of the second transistor, the second electrode of the second transistor is connected to a second electrode of the third transistor, a first electrode of the third transistor is connected to an anode of the light-emitting unit, a gate of the third transistor is input with a second light-emitting signal, a cathode of the light-emitting unit is input with a low-electric potential power supply signal, one terminal of the first capacitor is connected to the first electrode of the first transistor, and another terminal of the first capacitor is connected to the second electrode of the second transistor;

the external detection module comprises a first switch, a second switch, a chip, and a fourth transistor, a gate of the fourth transistor is input with a first scan signal, and a second electrode of the fourth transistor is electrically connected to the second electrode of the second transistor, a first electrode of the fourth transistor is connected to the chip through a first branch and a second branch arranged in parallel, the first branch comprises the first switch, and the second branch comprises the second switch;

the internal compensation module comprises a third capacitor, a fifth transistor, a seventh transistor, an eighth transistor, and a ninth transistor, one terminal of the third capacitor is connected to a gate of the second transistor, and another terminal of the third capacitor is connected to the second electrode of the second transistor, a gate of the fifth transistor is input with the first scan signal, a second electrode of the fifth transistor is electrically connected to a second electrode of the ninth transistor, a first electrode of the fifth transistor is connected to the second electrode of the first transistor, a first electrode of the ninth transistor is connected to the first electrode of the first transistor, and a gate of the ninth transistor is input with a third scan signal, a second electrode of the seventh transistor is connected to the second electrode of the ninth transistor, a first electrode of the seventh transistor is electrically connected to the gate of the second transistor, a gate of the seventh transistor is input with a fourth scan signal, a gate of the eighth transistor is input with a fifth scan signal, a first electrode of the eighth transistor is input with a second data signal, and a second electrode of the eighth transistor is connected to the gate of the second transistor.

11. The display panel of claim 10, wherein the positive shift of the shift direction of the threshold voltage means that the threshold voltage is greater than or equal to 0; and the negative shift of the shift direction of the threshold voltage means that the threshold voltage is less than 0.

12. The display panel of claim 10, wherein when the threshold voltage is greater than or equal to 0, the internal compensation module is configured to use the first timing sequence to compensate the threshold voltage, and a compensation range of the threshold voltage is a first range; and when the threshold voltage is less than 0, the internal compensation module is configured to use the second timing sequence to compensate the threshold voltage, the compensation range of the threshold voltage is a second range, and the first range is different from the second range.

13. The display panel of claim 12, wherein the first range ranges from 0 to 4V, and the second range ranges from −3V to 2V.

14. The display panel of claim 10, wherein the pixel driving circuit further comprises a reset module, the reset module comprises a sixth transistor and a second capacitor, a gate of the sixth transistor is input with a second scan signal, a second electrode of the sixth transistor is connected to the anode of the light-emitting unit and the second capacitor, and a first electrode of the sixth transistor is input with a reset signal.

15. The display panel of claim 14, wherein working stages of the external detection module comprises an initialization stage, a storage stage, and a detection stage; in the initialization stage, the external detection module resets a potential of a G-point at the gate and a potential of an S-point at the second electrode of the second transistor; in the storage stage, the external detection module charges the second electrode of the second transistor to turn off the second transistor; and in the detection stage, the external detection module reads the threshold voltage of the second transistor.

16. The display panel of claim 15, wherein in the initialization stage, the first scan signal and the fifth scan signal are at a high potential, the fourth transistor is turned on, the eighth transistor is turned on, the second data signal is at a low potential, the low potential $V_{dataL}$ of the second data signal is written to the G-point at the gate of the second transistor, a constant reference voltage $V_{ref}$ is written to the S-point at the second electrode of the second transistor, and at this time, the potential $V_g$ of the G-point and the potential $V_s$ of the S-point are initialized, where $V_s=V_{ref}$ and $V_g=V_{dataL}$;

in the storage stage, the fifth scan signal is at the high potential, the eighth transistor is turned on, the second data signal is at the high potential, and at this time, the high potential $V_{dataH}$ of the second data signal is written to the G-point, the second transistor is turned on, and the S-point starts to be charged; when $V_s=V_{dataH}-V_{th}$, the second transistor is turned off, wherein the threshold voltage of the second transistor is $V_{th}$, and the potential of the S-point is charged to $V_s=V_{dataH}-V_{th}$; and in the detection stage, the first scan signal is at the high potential, the fourth transistor is turned on, the first switch is turned off, the first data signal is not input, and the second switch is turned on, so that the chip reads the potential of the S-point and acquires the threshold voltage $V_{th}$ of the second transistor.

17. The display panel of claim 16, wherein when the $V_{th}>0$, the internal compensation module uses the first timing sequence to compensate the threshold voltage, and working stages of the first timing sequence comprises a first reset stage, a writing and compensation stage, and a first light-emitting stage;

in the first reset stage, the third scan signal and the fourth scan signal are at the high potential, the seventh transistor and the ninth transistor are turned on, the high-electric potential power supply signal $V_{DD}$ is written to the G-point, the second scan signal is at the high potential, the sixth transistor is turned on, the reset signal $V_i$ is written to an A-point connecting the second capacitor and the first electrode of the sixth transistor, and at this time, the potential of the G-point is $V_g=V_{DD}$, and the potential $V_a$ of the A-point is equal to the $V_i$;

in the writing and compensation stage, the first light-emitting signal, the first scan signal, the second scan signal, the fourth scan signal, and the fifth scan signal are at the high potential, the first switch, the first transistor, the second transistor, the fourth transistor, the fifth transistor, the sixth transistor, and the seventh transistor are all turned on, the high potential $V_{DataH}'$ of the first data signal is written to the S-point, and at this time, the potential of the G-point is a sum of the potential of the S-point and the threshold voltage of the second transistor, and the potential of the A-point maintains at the $V_i$; and in the first light-emitting stage, the first light-emitting signal, the second light-emitting signal, the second data signal, and the fifth scan signal are at the high potential, the first transistor, the second transistor, and the third transistor are turned on, the potential $V_a$ of the A-point is equal to a sum of a voltage $V_{F,LED}$ of the light-emitting unit, the low-electric potential power supply signal $V_{SS}$, and a voltage $V_{IR(VSS)}$ of a wiring connecting the A-point and the light-emitting unit, the fourth scan signal is at the high potential, the seventh transistor is turned on, the potential of the G-point is increased by the potential of the A-point through the second capacitor, at this time, the potential of the G-point is $V_g=V_{DataH}'+V_{th}-V_{init}+V_{F,LED}+V_{SS}+V_{IR(VSS)}$, and the potential $V_s$ of the S-point is equal to a sum of the voltage $V_{F,LED}$ of the light-emitting unit, a divided voltage $V_{T3}$ of the third transistor, the voltage $V_{SS}$ of the low-electric potential power supply signal, and a voltage $V_{IR(VSS)}'$ of a wiring connecting the S-point and the light-emitting unit.

18. The display panel of claim 16, wherein when $V_{th}<0$, the internal compensation module uses the second timing sequence to compensate the threshold voltage, working stages of the second timing sequence comprises a second reset stage, an acquisition and storage stage, a data writing stage, and a second light-emitting stage;

in the second reset stage, the first scan signal and the fifth scan signal are at the high potential, the first switch is turned on, the fourth transistor is turned on, a $V_{neg}$ signal carried by the first data signal is written into the potential of the S-point, the eighth transistor is turned on, a $V_{pre}$ signal carried by the second data signal is written into the potential of the G-point to initialize the potentials of the G-point and the S-point, wherein $V_g=V_{pre}$ and $V_s=V_{neg}$;

in the acquisition and storage stage, the first scan signal, the fourth scan signal, the fifth scan signal, and the second data signal are at the high potential, the second transistor, the fifth transistor, and the seventh transistor are turned on; after the potential of the S-point is charged to $V_S=V_{pre}-V_{th}$, the second transistor is turned off, the S-point stops being charged, and the potential of the S-point maintains at $V_s=V_{pre}-V_{th}$;

in the data writing stage, the second data signal carries the high potential $V_{data2}$, the fifth scan signal is at the high potential, the eighth transistor is turned on, the potential of the G-point is $V_{data2}$, the second transistor is turned on, a coupling of the G-point through the third capacitor increases the potential of the S-point, at this time, the potential of the S-point is $V_s=(V_{pre}-V_{th})+(V_{data2}-V_{pre})*C_3/(C_1+C_3)$, a potential difference between the G-point and the S-point is $V_{gs}=(V_{data2}-V_{pre})*C_1/(C_1+C_3)+V_{th}$, wherein $C_1$ is a capacitance value of the first capacitor and $C_3$ is a capacitance value of the third capacitor; and in the second light-emitting stage, the potentials of the G-point and the S-point are maintained, the first light-emitting signal, the second light-emitting signal, the second data signal, and the fifth scan signal are at the high potential, and the first transistor, the second transistor, and the third transistor are turned on to cause the light-emitting unit to emit light.

* * * * *